2,884,427
SYNTHESIS OF COUMESTROL AND ITS ESTERS

Oliver H. Emerson, Orinda, and Emanuel M. Bickoff, Berkeley, Calif., assignors to the United States of America as represented by the Secretary of Agriculture No Drawing. Application January 22, 1958
Serial No. 710,586

4 Claims. (Cl. 260—343.2)

(Granted under Title 35, U.S. Code (1952), sec. 266)

A non-exclusive, irrevocable, royalty-free license in the invention herein described, throughout the world for all purposes of the United States Government, with the power to grant sub-licenses for such purposes, is hereby granted to the Government of the United States of America.

This invention relates in general to coumarin derivatives and processes for synthesizing them. The objects of the invention include the provision of novel methods for synthesizing coumestrol and its esters and the provision of new coumarin derivatives valuable as intermediates in the preparation of coumestrol and the esters thereof. Further objects and advantages of the invention will be evident from the following description.

In the copending patent application of E. M. Bickoff and A. N. Booth, Serial No. 693,785, filed Oct. 31, 1957, there is disclosed a previously unknown compound and methods for isolating it from forage crops such as ladino clover. The inventors also disclose that the compound exhibits estrogenic activity and may be employed in animal raising to obtain increased weight gain and increased efficiency of feed utilization. The compound in question has been named coumestrol by the inventors and structurally it is 7',6-dihydroxycoumarino (3',4'-3,2) coumarone having the formula:

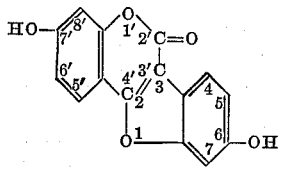

The compound will be referred to herein as coumestrol for the sake of brevity without loss of accuracy.

It has now been found that coumestrol and its esters can be produced by organic synthesis in good yields by a relatively simple process. A preferred embodiment of the process is set forth below by way of illustration but not limitation:

EXAMPLE I a. Preparation of 3(2,4-dimethoxyphenyl)-4,7-dihydroxy coumarin

Omega (2,4-dimethoxyphenyl) resacetophenone (3.1 g.), acetone (50 ml.), methyl chloroformate (2 ml.), and potassium carbonate (8 g.) were refluxed for four hours. The reaction mixture was cooled, diluted with 100 ml. of water and acidified with hydrochloric acid. The precipitate was filtered, washed with water and dried. The dry precipitate was dissolved in about 20 ml. of methanol and to this solution was added sufficient of a 20% solution of potassium hydroxide in methanol to turn alizarin-yellow orange (pH about 11). The solution was refluxed for 10 minutes under an inert atmosphere, then cooled, diluted with water, and acidified with hydrochloric acid. The precipitate was filtered off and recrystallized from alcohol. The product, 3(2,4-dimethoxyphenyl)-4,7-dihydroxy coumarin, obtained in a yield of 75%, had a melting point of 250–255° C. Analysis.—Calculated for $C_{17}H_{14}O_6$: C, 64.95%; H, 4.49%. Found: C, 65.0%; H, 4.5%.

The reactions involved in this step are illustrated by the equations below:

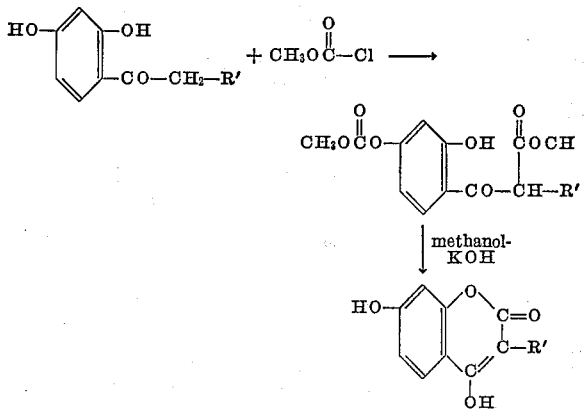

wherein R' is the 2,4-dimethoxyphenyl radical.

b. Preparation of coumestrol

One gram of 3(2,4-dimethoxyphenyl)-4,7-dihydroxy coumarin was mixed with 2 grams of aniline hydrochloride. The mixture was heated under an atmosphere of carbon dioxide for 2.5 hours at 210–220° C. The reaction mixture was cooled, then successively extracted with water to remove aniline hydrochloride and then with ethyl acetate (about 10 cc.) to remove pigmented impurities. The residue was coumestrol, obtained in a yield of 60%.

The reaction in this step is illustrated by the equation—

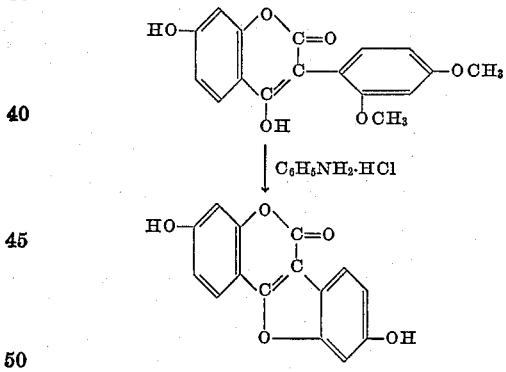

c. Preparation of coumestrol diacetate

The coumestrol produced as above described was suspended in a mixture of 10 ml. of acetic anhydride and 1 g. of fused sodium acetate. The mixture was brought to a boil for a few minutes, then poured into water. The coumetrol diacetate was filtered off and recrystallized from acetic acid. The recrystallized product had a melting point of 234–235° C. Analysis.—Calculated for $C_{19}H_{12}O_7$: C, 64.75%; H, 3.44%. Found: C, 64.7%; H, 3.51%. The yield was 50%, based on the amount of 3(2,4-dimethoxyphenyl)-4,7-dihydroxy coumarin. The product may also be termed 7',6-diacetyloxy coumarino-(3',4'-3,2)-coumarone. It has the formula—

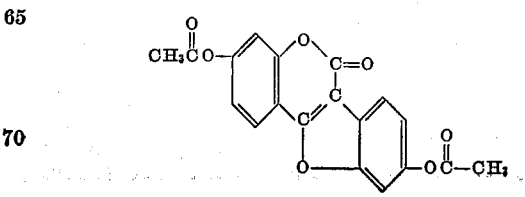

It will be found in a practice of the method exemplified above that many variations may be followed within the scope of the invention. For example, regarding the first step of the process (part a, above) a preferred starting material is omega (2,4-dimethoxyphenyl) resacetophenone. However, it is not essential that the substituents at the 2 and 4 positions be methoxy groups; other alkoxy substituents may be present at these positions. Thus in general the starting material may be an omega (2,4-dialkoxyphenyl) resacetophenone. Preferably, the alkoxy groups are of short carbon chain length such as methoxy, ethoxy, propoxy, isopropoxy, or butoxy. Such alkoxy groups are easily converted into hydroxy groups as required in a further step of the synthesis. It is of course essential that the alkoxy groups be at the 2 and 4 positions so that the desired end product will be produced. The omega (2,4-dialkoxyphenyl) resacetophenones may be prepared as well known in the art by condensation of resorcinol with a 2,4-dialkoxyphenyl acetonitrile in the presence of HCl and zinc chloride.

Having selected a starting compound from the group of omega (2,4-dialkoxyphenyl) resacetophenones, this compound, as illustrated in Example I, part a, is reacted with at least two moles, but preferably an excess, of an alkyl haloformate. Methyl chloroformate is generally preferred as the latter reactant but analogous esters such as the ethyl, propyl, isopropyl, or butyl esters of chloroformic, bromoformic, or iodoformic acid may be employed. The reaction is conducted under essentially anhydrous conditions. The temperature of reaction is not critical and may vary, for example, from 0 to 100° C. Usually a temperature of about 50-70° C. is preferred as providing rapid rate of reaction without danger of decomposition. An inert solvent is preferably added to the reactants to promote contact therebetween. Suitable solvents are for example, benzene, toluene, xylene, dioxane, acetone, ether, methyl-ethyl ketone, diethyl ketone, diisopropyl ether, the dimethyl or diethyl ethers of ethylene glycol, etc. In general refluxing the reactants in acetone (boiling point 56° C.) is preferred. Also, to promote the reaction an esterification promoter having moderate alkalinity is preferably employed. For such purpose, one may employ an alkali metal carbonate or bicarbonate or a tertiary amine such as pyridine, quinoline, N-dimethyl aniline, N-dimethyl cyclohexylamine, N-methyl piperidine, etc. The alkaline agent is added in at least the stoichiometrical amount required to neutralize the hydrogen halide evolved in the reaction. As disclosed in the first equation following part a of Example I, the substituted resacetophenone and haloformate react to form an intermediate which may be described as a 2-hydroxy-4-alkylcarbonatophenyl-α-carbomethoxy-2,4-dimethoxybenzyl ketone. It is to be observed that the hydroxy group at the 2 position is not esterified because it is chelated with the carbonyl group attached at the 1-position. Where the reaction is carried out in the presence of sodium carbonate or the like this intermediate is produced as a salt, or more accurately, a phenate, and in isolating it from the reaction mixture it is preferred to acidify the mixture to convert the intermediate to the free phenol form. For such purpose one may employ any acid as hydrochloric, sulphuric, acetic, phosphoric, etc. This step facilitates isolation of the product since the free phenol form is relatively insoluble in water.

In order to form the desired 3(2,4-dialkoxyphenyl)-4,7-dihydroxy coumarin from the intermediate referred to immediately above, the intermediate is contacted with an alkaline agent such as potassium hydroxide, sodium hydroxide, an alkali metal alcoholate, or the like. The reaction may be conducted in an aqueous system but preferably the reactants are dissolved in an inert organic solvent such as methanol, ethanol, propanol, isopropanol, any of the isomeric butyl alcohols, the mono-methyl or mono-ethyl ethers of ethylene glycol, etc. The amount of alkaline agent is not critical, usually enough alkali is employed to maintain the reaction mixture in a strongly alkaline condition, that is, at a pH of about 11. The temperature of reaction is not critical and may be varied from about 0 to 100° C. Usually a temperature of about 50-75° C. is preferred as giving a rapid rate of reaction without danger of decomposition. Also, to avoid formation of gummy by-products it is preferred to conduct the reaction under an inert atmosphere, for example, under nitrogen. After the reaction is complete the salt of the 3(2,4-dialkoxyphenyl)-4,7-dihydroxy coumarin is treated with an acid such as hydrochloric, sulphuric, acetic, etc. to produce the free phenol form of this compound. This facilitates its isolation since the free phenol form is relatively insoluble in water.

In the next step of the synthesis, illustrated in Example I, part b, the 3(2,4-dialkoxyphenyl)-4,7-dihydroxy coumarin is dealkylated and cyclized to form coumestrol. To accomplish this, the substituted coumarin is heated with a salt of an aromatic amine and a hydrohalic acid. Suitable salts are, for example, the hydrochlorides or hydrobromides of aniline, alpha-naphthyl amine, beta-naphthyl amine, o-toluidine, m-toluidine, p-toluidine, para-chloro-aniline, and the like. The amine salt is provided in an amount to furnish 2 mols thereof per mol of substituted coumarin. Preferably, an excess of amine salt is employed to operate both as reactant and as a flux to lower the melting point of the reaction mixture. The reaction essentially involves mixing the substituted coumarin and amine salt and heating at a temperature at which the mixture becomes liquid. This temperature will usually be about 200-300° C. depending on the amine salt used and the proportion thereof in the mixture. The reaction is preferably conducted under an atmosphere of an inert gas, such as carbon dioxide or nitrogen, to minimize oxidative side-reactions. Completion of the reaction is indicated by the crystallization of coumestrol from the molten mass whereby the mass eventually becomes essentially solid. Coumestrol may be recovered from the reaction mixture by first extracting the amine salt therefrom with water and re-crystallizing the residual coumestrol from methanol or methanol-chloroform. Coumestrol may also be isolated by distillation since it sublimes at 325° C. under atmospheric pressure or at 175° C. under vacuum (7 microns pressure).

In our researches we have found that 3(2,4-dimethoxyphenyl)-4,7-dihydroxy coumarin may be converted to coumestrol by refluxing with concentrated aqueous hydriodic acid. This procedure is, however, not satisfactory as the yield of coumestrol is low—about 20%— whereas by the described process involving heating of the coumarin derivative with an amine salt, the yield of coumestrol is 60%.

It will be observed that the net result of the step illustrated in part b of Example I is a conversion of the methoxy groups to hydroxy groups and a cyclization. It is evident that were the starting material to contain alkoxy groups other than methoxy groups the same result would follow. For example, if the amine salt were reacted with 3(2,4-diisopropoxyphenyl)-4,7-dihydroxy coumarin, the reaction would involve conversion of the isopropoxy groups to hydroxy groups and cyclization to produce coumestrol. In the same way coumestrol would be produced regardless of the identity of the alkoxy groups on the original starting compound or the intermediate compounds and these alkoxy groups could be for example methoxy, ethoxy, propoxy, isopropoxy or butoxy with the same end result. To further illustrate this point, assume that the original starting material selected would be omega (2,4-diethoxyphenyl) resacetophenone. In such case the reaction with chloroformate and subsequent alkali treatment would produce 3(2,4-diethoxy phenyl)-4,7-dihydroxy coumarin and reaction of this compound with the amine salt would produce coumestrol.

Referring now to part c of Example I, usually it is preferred to esterify the coumestrol since the esters are more stable and more easily crystallized than the coumestrol itself. To this end the coumestrol prepared by the cyclization and dealkylation described above is reacted with an acylating agent, for example, the anhydride, chloride, bromide or iodide of an acid such as acetic, propionic, butyric, isobutyric, valeric, caproic, caprylic, capric, lauric, palmitic, stearic, oleic, palmitoleic, arachidic, etc. The acylating agent is employed in a proportion to furnish at least 2 moles of the acylating agent per mole of coumestrol thus to ensure esterifying both hydroxyl groups. To enhance contact between the reactants an inert solvent may be added, or, in the alternative, such as excess of acylating agent may be used as to function as both reactant and solvent. Suitable inert solvents are for example benzene, toluene, xylene, dioxane, acetone, ether, methyl-ethyl ketone, diethyl ketone, diisopropyl ether, the diethyl ether of ethylene glycol, etc. The temperature of reaction is not critical and may be varied from about 0 to 150° C. To expedite the esterification, a conventional esterification-promoter is added, for example, the alkali metal salt of the acid in question (e.g., sodium acetate where coumestrol acetate is being prepared), pyridine, quinoline, potassium carbonate, and the like. The coumestrol esters are readily isolatable from the reaction mixture on addition of water since they are relatively insoluble in this solvent.

The intermediate compounds, which may be produced in accordance with the procedure illustrated in Example I, part a, are new compounds not heretofore prepared or described. These 3(2,4-dialkoxyphenyl)-4,7-dihydroxy coumarins may be depicted by the formula—

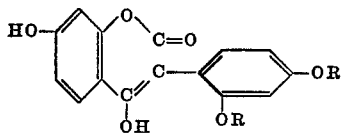

wherein the OR's represent the same, or dissimilar, alkoxy radicals particularly lower alkoxy radicals such as methoxy, ethoxy, propoxy, isopropoxy, butoxy, etc. These compounds are particularly useful as intermediates in the preparation of coumestrol and coumestrol esters as described herein.

The coumestrol as produced in accordance with the invention is identical with coumestrol as isolated from plant materials and can be employed in the same manner as native coumestrol for its estrogenic activity. Thus the synthetic coumestrol may be utilized in animal raising in all of the ways disclosed in the aforementioned Bickoff and Booth application. Moreover, the coumestrol esters exhibit essentially the same estrogenic properties, qualitatively and quantitatively, as coumestrol. Thus the esters can also be employed in animal raising in all of the ways disclosed in the aforesaid Bickoff and Booth application, in place of coumestrol. For such purposes one may use the esters of coumestrol with aliphatic carboxylic acids such as acetic, propionic, butyric, isobutyric, valeric, caproic, caprylic, capric, lauric, myristic, palmitic, stearic, oleic, palmitoleic, arachidic, etc.

The estrogenic activity of coumestrol diacetate is illustrated by the following example:

EXAMPLE II

Estrogenic assays were conducted by feeding female mice with a basal ration containing coumestrol diacetate. A control batch of mice were fed the basal ration as such. After a period of 6 days, the mice were sacrificed and their uteri were excised and weighed. An increase in uterine weight denotes estrogenic activity in the material under test, the greater the uterine weight over the control, the more potent the material tested. The basal ration had the following composition:

| Ingredient: | Proportion, percent |
|---|---|
| Corn meal | 75 |
| Linseed oil cake | 10 |
| Crude casein | 10 |
| Codliver oil | 3 |
| Bone ash | 1.5 |
| Sod. chloride | 0.5 |

In these tests, the mice were fed with the ration ad libitum, supplying a definite amount of ration to each animal so that at the end of the test the amount of ration consumed by each animal can be calculated whereby to determine the amount of test material ingested by each animal.

The results of the assays are set forth below:

| Material tested | Amount fed, mg. per mouse | Uterine weight, mg. |
|---|---|---|
| Control (basal ration) | | 17 |
| Coumestrol diacetate | 1 | 42 |

It is well known in the field of animal husbandry that it is often desirable to provide animals with estrogenic preparations particularly for the purpose of increasing weight gain and increasing efficiency of feed utilization. Such effects can be obtained by adding to the regular diet a minor proportion of diethyl stilbestrol. Also, estrogenic agents such as diethyl stilbestrol can be implanted subcutaneously in animals to obtain the desired effects. Such procedure is commonly employed with fowls. Coumestrol and its esters display estrogenic properties and can be employed in place of known estrogenic compounds, as in feeds or in subcutaneous implantation, to accomplish like results of accelerating weight gain and increasing the proportion of flesh produced per lb. of feed. These compounds constitute a source of high and uniform estrogenic potency. As a consequence they can be administered to animals in controlled dosages to obtain predetermined physiological responses. Problems of low estrogenic concentration and variable estrogenic activity as encountered in direct feeding of forage containing natural estrogenic principles are completely obviated. Moreover, administration of coumestrol or its esters does not involve any physical difficulty of feeding because the compounds can be administered in feeds or other compositions the ingredients of which can be selected to be compatible with the digestive systems or other characteristics of the animals in question. Also, the compounds can be administered by subcutaneous implantation or other techniques which require an active material free from extraneous components. Another point is that the compounds are free from growth-inhibiting factors, saponins, or other detrimental agents naturally present in forage materials. Consequently, their administration to animals yields the useful results of attaining desired physiological response without any undesired side effects such as growth inhibition, bloating, etc.

Coumestrol and its esters may be employed in animal husbandry in the same manner as convention with diethylstilbestrol and other known estrogenic agents. Thus the compounds may be administered by incorporating them in conventional feeds; by dispersion in water or other fluid; by addition to grit fed to birds; by administration in capsules, pellets or by injection; by implantation of pellets, and so forth. The amount of the compound to be administered will of course vary depending on the type of animal, the body weight thereof, the physiological response desired, and the mode of administration. For example where the estrogenic compound is administered in admixture with a feed, dosage thereof may be that physiologically equivalent to about from 0.01 to 8 milligrams of diethylstilbestrol per 100 lbs. of body weight per day. Generally it is preferred to administer the compounds by incorporating them in a conventional feed. Thus the feed may consist mainly of vegetable material such as corn, wheat, barley, milo, hay, dehydrated alfalfa or other forage material, soybean meal, cottonseed meal, distillers grains, peanut meal, oat hulls, bran, corn stalks, corn cobs, sorghum, beet pulp, or the like. For a high-energy diet a major proportion of grain or oil-seed meal is preferred. In addition to the main vegetable portion, the feed may contain the usual supplements such as mineral salts, vitamin preparations, fish meal, fish oil, linseed oil, antibiotic supplements, and so forth. In general the feed may contain on the order of 0.001 to 1 lb. of coumestrol or coumestrol ester per ton of feed. The compounds may be applied for example to chickens, turkeys, geese, ducks, swine, sheep, cattle, horses, and so forth. Thereby, important practical effects are gained including increased rate of gain and increased efficiency of feed utilization. As noted above, the invention is of particularly practical value as applied to animals, such as steers, which are grown primarily for meat. Thus by administration of coumestrol or its esters the animals are caused to gain weight more rapidly and produce more flesh per unit weight of feed with resulting economic benefits.

Having thus described our invention, we claim:

1. The method for preparing 7',6-dihydroxycoumarino-(3',4'-3,2) coumarone which comprises heating, at about from 200 to 300° C., 3(2,4-diloweralkoxyphenyl)-4,7-dihydroxy coumarin with a salt selected from the group consisting of the hydrochlorides and hydrobromides of aniline, alpha-naphthyl amine, beta-naphthyl amine, o-toluidine, m-toluidine, p-toluidine, and para-chloro aniline to produce 7',6-dihydroxycoumarino-(3',4'-3,2) coumarone.

2. The method of claim 1 wherein the salt is aniline hydrochloride.

3. The method for preparing 7',6-dihydroxycoumarino-(3',4'-3,2) coumarone which comprises heating, at about from 200 to 300° C., 3(2,4-dimethoxyphenyl)-4,7-dihydroxy coumarin with a salt selected from the group consisting of the hydrochlorides and hydrobromides of aniline, alpha-naphthyl amine, beta-naphthyl amine, o-toluidine, m-toluidine, p-toluidine, and para-chloro aniline to produce 7',6-dihydroxycoumarino (3',4'-3,2) coumarone.

4. The method of claim 3 wherein the salt is aniline hydrochloride.

References Cited in the file of this patent

Shriner et al.: Iden. of Org. Cmpds., p. 104, Wiley (1948).
Boyd et al.: J. Chem. Soc., pp. 174–176 (1948).
Mentzer: Chem. Abst., vol. 45, p. 10245C (1951).